United States Patent
Marcatili

[11] 3,814,499
[45] June 4, 1974

[54] OPTICAL CABLE INCLUDING A PLURALITY OF SINGLE MATERIAL FIBERS

[75] Inventor: Enrique Alfredo Jose Marcatili, Rumson, N.J.

[73] Assignee: Bell Telephone Laboratories, Murray Hill, N.J.

[22] Filed: May 11, 1973

[21] Appl. No.: 359,232

[52] U.S. Cl. ............... 350/96 WG, 65/4, 65/DIG. 7, 350/96 B
[51] Int. Cl. ............................................. G02b 5/16
[58] Field of Search ..................... 350/96 WG, 96 B

[56] References Cited
UNITED STATES PATENTS
3,391,969  7/1968  Ogle .................................. 350/96 B
3,434,774  3/1969  Miller ............................. 350/96 WG

*Primary Examiner*—John K. Corbin
*Attorney, Agent, or Firm*—D. I. Caplan

[57] ABSTRACT

A plurality of hollow tubes of single-material optical fibers are closely packed together within an optical absorbing housing. The single-material neighborhood regions of tangency of mutually contacting pairs of tubes thereby form optical waveguides which support single mode optical transmission.

10 Claims, 4 Drawing Figures

PATENTED JUN 4 1974 3,814,499

OPTICAL CABLE INCLUDING A PLURALITY OF SINGLE MATERIAL FIBERS

FIELD OF THE INVENTION

This invention relates to the field of optical communication systems, and more particularly to optical fiber structures.

BACKGROUND OF THE INVENTION

In the prior art, optical waveguides in the form of optical fibers have been utilized for the propagation of optical wave energy in a single mode or in multimodes from one location to another. A basic problem arises in these optical fibers involving the need for the attachment of supporting members, which are required for mechanical support, uniformly along the whole length of the optical fibers. In particular, at the juncture of the supporting member with the optical fiber, an optical disturbance or perturbation is introduced in the modes of wave energy being transmitted through the fiber. This perturbation causes various problems in the propagation of the electromagnetic signal wave energy, such as the unwarranted conversion of signal energy from one mode to another mode, with consequent distortion problems. Another problem arises from the need for "cladding" material surrounding the central core of optical fibers, in order to keep foreign materials (such as dust) from contacting the central core and thereby causing further undesired perturbations of the optical modes propagating through the core. Such cladding must ordinarily be made of a material having a lower optical refractive index than that of the core. For such desirable core materials as fused silica, it is difficult to find correspondingly suitable cladding which has a lower refractive index than the core and, at the same time, presents sufficiently low optical absorption loss to make the fiber commercially attractive. Moreover, ordinarily this "cladding" material obstructs any coating of the optical fiber core with various optical materials which could serve to provide purposeful interaction with the signal wave energy propagating through the optical fiber.

As more fully discussed in an article by P. Kaiser, E. A. J. Marcatili and S. E. Miller, 52(2) *Bell System Technical Journal* (BSTJ), February 1973, pp. 265-269, and also in U.S. Patent Application Ser. No 308,833 of S. E. Miller, single-material optical fibers possess certain advantages. Those fibers each consisted of a single fiber optic material which has a solid central portion, with two or more thin supporting members of the same single material fused to the central portion. Briefly, the advantages of those single-material fibers include freedom from optical energy losses ordinarily caused by the cladding, as well as freedom from the obstruction of such cladding which blocks off external access to the propagating optical radiation in the fiber, such access being desirable for interacting with the signal along the fiber transmission path. It would also be desirable, for the purpose of multiple path transmission, to have a plurality of single-material optical fibers which can be closely packed together rather simply for providing many independent optical waveguides in a single cable enclosure.

SUMMARY OF THE INVENTION

A plurality of substantially identical, hollow, single- material, optical fiber tubes are situated within an optically absorptive cable enclosure. Each such hollow tube is in physical contact (tangency) with at least one other of such tubes. The optically smooth outside surfaces of contacting pairs of tubes, particularly in the region of tangency, provide close optical coupling of optical radiation propagating in both tubes in each pair. Thereby, a region in the single material of a pair of mutually tangent tubes, in a neighborhood of the points of tangency, provides a waveguide region. The cross section of the central portion of each such region is twice as thick as the (four) peripheral portions which emanate from the point of tangency. Consequently, this region can serve as an optical waveguide which supports single mode propagation, in accordance with the same type of theory as set forth in the aforementioned BSTJ article. At the same time, by packing a plurality of such tubes closely together in the optical cavity (cable) enclosure, a simple means is afforded for providing a cable including many single mode optical waveguides. Moreover, the space neighboring the outside surface of the tubes can be partially or completely filled with electrooptic materials for interacting with the optical modes propagating in these waveguides.

In a specific embodiment of the invention, a lossy enclosure of tinted fused silica doped with suitable impurities encloses a plurality of hexagonally close-packed, thin-walled cylindrical tubes of essentially pure fused silica. All of the tubes are substantially identical and each tube contacts six neighboring tubes (except for those tubes in contact with the lossy enclosure). Thereby, the regions of single material, respectively including each of the points of contact of the various tubes, form optical waveguide regions suitable for the propagation of optical radiation in a single mode.

BRIEF DESCRIPTION OF THE DRAWING

This invention together with its features, advantages and objects may be better understood from the following detailed description when read in conjunction with the drawing in which.

DETAILED DESCRIPTION

Figure 1:
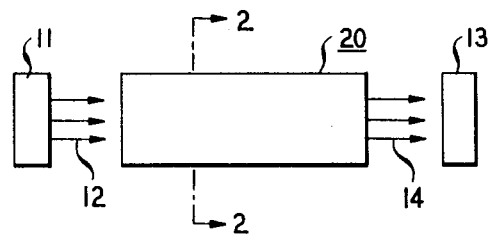
FIG. 1 shows an optical communication system including an optical waveguide cable.
Figure 2:
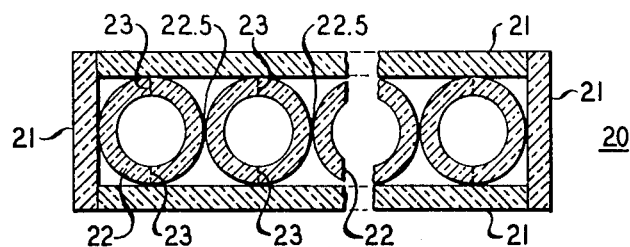
FIG. 2 is a cross-sectional view of an optical cable (tape), in accordance with a one-dimensional embodiment of the invention.

As shown in FIG. 1, a source of optical radiation 11 furnishes an input of optical radiation 12 to an optical transmission cable device 20. Output radiation 14 exiting from the cable device 20 is detected and utilized by means 13 for utilization of the output optical radiation. The cable 20 is shown in cross section in FIG. 2, wherein a plurality of hollow, cylindrical fiber tubes 22 are situated within an envelope ribbon cable 21. All of the fiber tubes 22 are typically substantially identical, and each tube has a pair of mutual tangency points 22.5 of contact with the next neighboring tubes on either side (except for the extreme left-hand and right-hand tubes). The axes of these tubes are advantageously all mutually parallel. Each tube has optically smooth inside and outside walls, to prevent optical scattering. Single-mode optical propagation can then be supported in a waveguide region in the fiber material of each pair of mutually contacting tubes 22. Each such region comprises the neighborhood of fiber material including the point 22.5 of mutual contact. For example, the dotted lines 23 delineate such a waveguide region, centered at the point of mutual contact 22.5, for the extreme left-hand pair of fibers in FIG. 2. Thus, for a number $n$ of tubes in the device 20, there are $n-1$ such independent waveguide regions each having a different point 22.5 in the center thereof. Hence, advantageously the optical utilization means 13 is provided with $n-1$ optical detectors each of which is located to accept and detect the optical output radiation exiting from a different one of such $n-1$ independent waveguides.

The envelope cable 21 is advantageously made of optically absorptive (lossy) material in order to reduce unwanted "crosstalk" optical interactions which otherwise might occur between waveguide regions in adjacent tubes.

In a typical example, by way of illustration only, each of the tubes 22 has a diameter of about 40 to 80 microns with a wall thickness of about 5 to 10 microns, for propagating optical radiation of about one micron in wavelength. In general, the thickness of these tubes 22 should be sufficiently large for ease of splicing together pairs of cables 21 containing these tubes; however, the thickness of these tubes 22 should not be too large as to cause unduly large radiation losses occasioned by the curvature of these tubes 22 along their axes. Typically, therefore, the thickness of each of these tubes 22 (measured from inner to outer surface thereof) is between about 5 and 10 wavelengths of the optical radiation to be guided therein.

The tubes 22 are typically all made of low optical attenuation glass such as fused silica. Advantageously, dry air or other inert atmosphere (i.e., no chemical reactions with the tubes 22 or the source 11) fills the empty spaces between adjacent tubes as well as the centrally enclosed space within each of the tubes. The ribbon cable enclosure 21 is made of (tinted) fused silica which has been doped with such elements as carbon, copper, iron, molybdenum or other metal transition elements, in order that the optical loss be sufficient to reduce the "crosstalk". In order to conserve ribbon material as well as to furnish overall compactness in space, the ribbon cable 21 is fabricated to be rather thin but consistent with sufficient mechanical strength and support, typically about 10 microns in thickness.

In a typical example, approximately ten fiber tubes 22 are situated within a single ribbon enclosure 21. Thus, the overall cross-section size of the enclosure 21 is approximately 50 to 100 microns by 500 to 1000 microns. It should be noted that either a male or a female plug may be inserted between the extreme right-hand (and/or left-hand) tubes 22 and the extreme right-hand (and/or left-hand) inside wall of the enclosure 21, in order to have a convenient mutual alignment method for the purpose of splicing together a pair of similar optical ribbon cables (including equal pluralities of similar fiber tubes).

Figure 3:
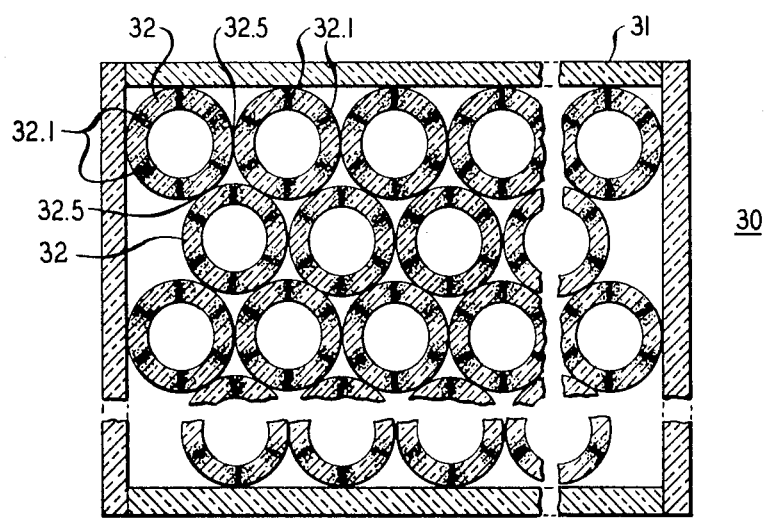
FIG. 3 is a cross-sectional view of an optical cable, in accordance with a two-dimensional embodiment of this invention.

Turning to FIG. 3, a two-dimensional array of optical fiber tubes 32 in an optical enclosure 31 forms an optical transmission cable device 30. All of the elements shown in FIG. 3 which are similar to those shown in FIG. 2 have been labeled with corresponding reference numerals which are equal to those in FIG. 2 plus ten. Advantageously, the optical fiber tubes 32 are in a hexagonal close-pack arrangement with mutual points of contact 32.5 between contiguous tubes 32. Again, it should be understood that each point 32.5 has an associated waveguide region in that pair of optical fiber tubes 32 which contact each other at said point 32.5, said waveguide region including said point 32.5. Hence, advantageously, the utilization means 13 is provided with an array of optical detectors each of which is located in optical registry with a different point 32.5, that is, each of the detectors accepts radiation exiting from each of the independent waveguides centered at a different point 32.5.

In order to prevent optical crosstalk between adjacent waveguide regions, each of the tubes 32 is advantageously provided with six optical absorbing regions 32.1 of doped tinted fused silica. Advantageously, each region 32.1 is centered angularly midway between successive contact points 32.5 in each such tube.

Figure 4:
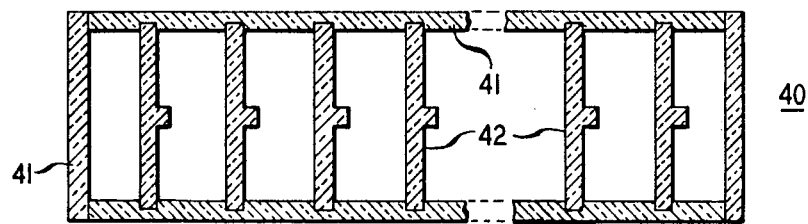
FIG. 4 is a cross-sectional view of a plurality of single-material optical waveguides, useful in understanding the advantages of the invention.

FIG. 4 shows how the optical fibers disclosed in the aforementioned BSTJ article can be integrated in a single ribbon cable structure 40. The relative ease and simplicity of fabrication of the device 20 shown in FIG. 2 relative to that shown in FIG. 4 should be obvious, in that there is no need for any slots in the enclosure 21 to engage the cylindrical tubes 22, as opposed to the required slots in the enclosure 41 to accommodate the fibers 42. However, the ribbon structure 40 illustrated in FIG. 4 may afford more close packing of individual fibers than the structure shown in FIG. 2. Moreover, while the structure shown in FIG. 2 can support only single mode propagation, the structure shown in FIG. 4 can support either single or multimode propagation, according to the criteria set forth in the aforementioned BSTJ article.

It should be understood that the final optical cable devices of this invention are typically fabricated by first arranging the single material tubes inside the cable enclosure, followed by heating and pulling (drawing) the assembly (of tubes plus enclosure) to a longer length with a smaller final cross-sectional size. In such cases, neighboring tubes (22 or 32) may become fused together in the neighborhoods including their mutual points (22.5 or 32.5) of contact.

Although this invention has been described in terms of specific embodiments, various modifications can be made without departing from the scope of the invention. For example, other optical fiber materials such as soda-lime-silicate glasses, boro-silicate glasses, or other optical glasses can be used for the optical fiber tubes 22 and 32; and other optically absorptive materials can be used for the enclosures 21 and 31, such as lossy plastics. Moreover, the space around the tubes 22 or the fibers 42 can be partially or completely filled with electrooptic solids or liquids for the purpose of interacting with the electromagnetic fields of the mode(s) being guided by the tubes or fibers.

What is claimed is:

1. Apparatus for propagating optical radiation which comprises a plurality of hollow cylindrical single-material uncladded optical fiber tubes, each tube being situated in physical tangency with at least one other of said tubes, the thickness of the tubes being such that a mode of optical radiation propagating parallel to the axes of a pair of mutually tangent tubes can be supported in said pair of fiber tubes in a region of their material which includes said tangency.

2. Apparatus according to claim 1 in which the hollow space within each tube is occupied by a dry inert gas.

3. Apparatus according to claim 2 which further includes an optically absorptive cable enclosing the fibers.

4. Apparatus according to claim 3 in which the space between tubes is occupied by a dry inert gas.

5. Apparatus according to claim 1 in which the thickness of the hollow tubes is between about five and ten wavelengths of the optical radiation.

6. Apparatus according to claim 1 in which the mutually tangent tubes are mutually fused together in neighborhoods including said tangency.

7. Apparatus according to claim 1 in which the tubes are situated in a mutual hexagonal close pack arrangement.

8. Apparatus according to claim 1 in which all the tubes are substantially identical hollow circular cylinders.

9. Apparatus according to claim 1 in which at least part of the space in the neighborhood of the outside surface of the pair of tubes is occupied with an electrooptic material for interacting with the optical mode propagating in the region.

10. Apparatus for propagating optical radiation in a single mode which includes at least one pair of hollow cylindrical uncladded optical fibers fused together in mutual contact, whereby said radiation can propagate in a region including a portion of both said fibers in the neighborhood of said contact.

* * * * *